US012572006B2

(12) United States Patent
Li et al.

(10) Patent No.: US 12,572,006 B2
(45) Date of Patent: Mar. 10, 2026

(54) POLYMER EYEPIECE ASSEMBLIES FOR AUGMENTED AND MIXED REALITY SYSTEMS

(71) Applicant: MAGIC LEAP, INC., Plantation, FL (US)

(72) Inventors: Ling Li, Cedar Park, TX (US); Chieh Chang, Cedar Park, TX (US); Sharad D. Bhagat, Austin, TX (US); Christophe Peroz, Tokyo (JP); William K. Jones, Jr., Fort Lauderdale, FL (US); Xiaopei Deng, Cedar Park, TX (US)

(73) Assignee: Magic Leap, Inc., Plantation, FL (US)

( * ) Notice: Subject to any disclaimer, the term of this patent is extended or adjusted under 35 U.S.C. 154(b) by 1167 days.

(21) Appl. No.: 17/290,079

(22) PCT Filed: Oct. 30, 2019

(86) PCT No.: PCT/US2019/058931
§ 371 (c)(1),
(2) Date: Apr. 29, 2021

(87) PCT Pub. No.: WO2020/092620
PCT Pub. Date: May 7, 2020

(65) Prior Publication Data
US 2021/0396987 A1 Dec. 23, 2021

Related U.S. Application Data

(60) Provisional application No. 62/752,838, filed on Oct. 30, 2018.

(51) Int. Cl.
*G02B 25/00* (2006.01)
*G02B 1/18* (2015.01)
(Continued)

(52) U.S. Cl.
CPC ........... *G02B 25/001* (2013.01); *G02B 6/138* (2013.01); *G02B 6/4267* (2013.01);
(Continued)

(58) Field of Classification Search
CPC ............ G02B 27/0172; G02B 27/0081; G02B 27/0176; G02B 6/138; G02B 6/4267; G02B 1/18; G02B 2027/11; G06T 19/006
See application file for complete search history.

(56) References Cited

U.S. PATENT DOCUMENTS

| | | | |
|---|---|---|---|
| 5,790,731 A | 8/1998 | Deveau | |
| 2003/0231851 A1 | 12/2003 | Rantala et al. | |

(Continued)

FOREIGN PATENT DOCUMENTS

| | | |
|---|---|---|
| CN | 1146245 A | 3/1997 |
| CN | 1901943 A | 1/2007 |

(Continued)

OTHER PUBLICATIONS

Office Action in Chinese Appln. No. 201980071842.7, dated Aug. 12, 2023, 22 pages (with English translation).

(Continued)

*Primary Examiner* — Thomas A Hollweg
*Assistant Examiner* — Mary A El-Shammaa
(74) *Attorney, Agent, or Firm* — Fish & Richardson P.C.

(57) ABSTRACT

Fabrication of augmented reality (AR) and mixed reality (MR) polymer eyepiece assemblies and the resulting AR/MR polymer eyepiece assemblies may include one or more features, separately or in any appropriate combination, to compensate for expected deformation and to maintain substantially uniform gaps between polymer layers. Such features include fabricating polymer eyepiece assemblies with components having coefficients of thermal expansion (CTE) that are substantially the same; modifying the surface (Continued)

chemistry or structure of one or more polymer layers to increase hydrophobicity or omniphobicity of the polymer layer; disposing adhesive between adjacent polymer layers in continuous and/or extended configurations; and disposing microspheres of different sizes at selected locations between polymer layers.

17 Claims, 6 Drawing Sheets

(51) Int. Cl.

| | | |
|---|---|---|
| *G02B 6/138* | (2006.01) | |
| *G02B 6/42* | (2006.01) | |
| *G02B 27/00* | (2006.01) | |
| *G02B 27/01* | (2006.01) | |
| *G06T 19/00* | (2011.01) | |

(52) U.S. Cl.

CPC ..... *G02B 27/0081* (2013.01); *G02B 27/0172* (2013.01); *G02B 27/0176* (2013.01); *G02B 1/18* (2015.01); *G02B 2027/011* (2013.01); *G06T 19/006* (2013.01)

(56) References Cited

U.S. PATENT DOCUMENTS

| | | | |
|---|---|---|---|
| 2006/0098452 A1 | 5/2006 | Choi et al. | |
| 2014/0140654 A1* | 5/2014 | Brown ............... | G02B 27/0172 |
| | | | 385/10 |
| 2014/0168260 A1 | 6/2014 | O'Brien et al. | |
| 2016/0252724 A1* | 9/2016 | Nikkhoo .............. | G02B 6/0043 |
| | | | 359/630 |
| 2016/0381790 A1 | 12/2016 | Markovsky et al. | |
| 2017/0146802 A1* | 5/2017 | Pletenetskyy ...... | G02B 27/0101 |
| 2017/0322364 A1 | 11/2017 | Girotto et al. | |
| 2017/0336552 A1* | 11/2017 | Masuda ............. | G02B 27/0101 |
| 2017/0363795 A1* | 12/2017 | Girotto ................ | G02B 6/0053 |
| 2018/0059320 A1* | 3/2018 | Miller ................... | G02B 27/01 |
| 2018/0231771 A1 | 8/2018 | Schuck, III et al. | |

FOREIGN PATENT DOCUMENTS

| | | | |
|---|---|---|---|
| CN | 1906985 A | 1/2007 | |
| CN | 101541530 A | 9/2009 | |
| CN | 103608937 A | 2/2014 | |
| CN | 106457758 A | 2/2017 | |
| CN | 106461811 A | 2/2017 | |
| CN | 107666297 A | 2/2018 | |
| CN | 107667306 A | 2/2018 | |
| CN | 107759934 A | 3/2018 | |
| JP | 2002127308 A | 5/2002 | |
| JP | 2004157520 A | 6/2004 | |
| JP | 2009145513 A | 7/2009 | |
| JP | 2010520493 A | 6/2010 | |

OTHER PUBLICATIONS

MEMS Reliability, Tabata and Tsuchiya (eds.), Mar. 31, 2009, p. 171, 5 pages (with English translation).
Moisture Detection Principle and Device, Krishevski (ed.), Oct. 31, 1986, p. 77, 4 pages (with English translation).
Office Action in Chinese Appln. No. 201980071842.7, dated Dec. 6, 2023, 13 pages (with English translation).
International Search Report and Written Opinion in related International Application No. PCT/US2019/058931, dated Mar. 19, 2020, 13 pages.
Office Action in Japanese Appln. No. 2021-523285, dated Jun. 5, 2023, 13 pages (with English translation).
Extended European Search Report in European Appln. No. EP19879571.8, dated Jul. 4, 2022, 9 pages.
Office Action in Chinese Appln. No. 201980071842.7, dated Mar. 1, 2024, 22 pages (with English translation).
Office Action in Chinese Appln. No. 201980071842.7, dated Feb. 2, 2023, 14 pages (with English translation).

* cited by examiner

-13.245 Max
-17.785
-22.325
-26.865
-31.405
-35.945
-35.945
-40.486
-45.024
-49.564
-54.104 Min 0    5e+003    1e+004    1.5e+004    2e+004

POLYMER EYEPIECE ASSEMBLIES FOR AUGMENTED AND MIXED REALITY SYSTEMS

CROSS-REFERENCE TO RELATED APPLICATIONS

This application is a U.S. National Stage Application under 35 U.S.C. § 371 and claims the benefit of International Patent Application No. PCT/US2019/058931 entitled "POLYMER EYEPIECE ASSEMBLIES FOR AUGMENTED AND MIXED REALITY SYSTEMS" and filed on Oct. 30, 2019, which claims the benefit of U.S. Provisional Patent Application No. 62/752,838 entitled "POLYMER EYEPIECE ASSEMBLIES FOR AUGMENTED AND MIXED REALITY SYSTEMS" and filed on Oct. 30, 2018, both of which are incorporated herein by reference in their entirety.

TECHNICAL FIELD

This invention is related to polymer eyepiece assemblies for augmented reality (AR) and mixed reality (MR) systems and methods of fabricating the polymer eyepiece assemblies.

BACKGROUND

Eyepiece assemblies for augmented reality (AR) and mixed reality (MR) systems are typically fabricated by stacking multiple layers of glass optical waveguides with an air gap between adjacent layers. FIG. 1 is a side view of glass eyepiece assembly 100 including glass optical waveguides 102 positioned between eye side glass cover 104 and world side glass cover 106. Optical waveguides 102 include various optical features, such as gratings, disposed in or on the waveguides. Light projected through the optical waveguides 102 can interact with the gratings such that the propagation direction of at least a portion of the light is changed. For example, optical waveguides 102 can include an in-coupling grating (ICG) region 108, an orthogonal pupil expander (OPE) region 110, and exit pupil expander (EPE) region 112. Glass optical waveguides 102 and glass covers 104, 106 are typically bonded at edges 114 with an ultraviolet (UV) curable adhesive 116 including silica microspheres of a size selected to achieve a desired spacing between adjacent layers. In some cases, glass eyepiece assembly 100 includes glass lens 118 (e.g., a prescription lens), which may be concave or convex.

Due at least in part to the low elastic modulus (Young's modulus) and high coefficient of thermal expansion (CTE) of polymers as compared to glass, parallelism may degrade during fabrication or operation of polymer eyepieces. As depicted in FIG. 2A, first polymer layer 200 may bend (e.g., bow or warp) relative to second polymer layer 202, contributing to non-uniform thickness of a gap, such as air gap 204 between polymer layers 200, 202, across the eyepiece area. Bending of a polymer layer toward (or away from) an adjacent polymer layer typically changes the depth plane of the image exiting the polymer waveguide layer toward a user's eye. Undesired bending of the polymer waveguide can alter the image perceived by the user and can decrease image quality. As depicted in FIG. 2B, bending of first polymer layer 200 may result in direct contact of first polymer layer 200 and second polymer layer 202 in region 206. Direct contact of adjacent polymer layers can allow leakage of propagating light from one layer into another layer, thereby contributing to deterioration of image quality. Thus, to successfully implement use of polymer layers in some configurations of AR/MR eyepieces, bending of the polymer layers should be reduced or minimized.

SUMMARY

In a first general aspect, an eyepiece assembly includes a first cover layer, a second cover layer, and a multiplicity of optical waveguides positioned between the first cover layer and the second cover layer. The first cover layer is adjacent to a first optical waveguide, and the second cover layer is adjacent to a second optical waveguide. An adhesive is between the first cover layer and the first optical waveguide, the second cover layer and the second optical waveguide, and adjacent pairs of optical waveguides. The first cover layer, the second cover layer, and each optical waveguide of the multiplicity of optical waveguides includes a polymer material, and a coefficient of thermal expansion of the polymer material and the adhesive is substantially the same.

Implementations of the first general aspect may include one or more of the following features.

The first cover layer, the second cover layer, and the multiplicity of optical waveguides may include the same polymer material. A coefficient of thermal expansion of the polymer material and the adhesive is typically in a range of 30 $\mu$m/m ° C. to 150 $\mu$m/m ° C. over a temperature interval of about $-20°$ C. to about 65° C. The coefficient of thermal expansion of the polymer material and the adhesive is substantially the same over a temperature range of about $-20°$ C. to about 65° C. A gap between adjacent pairs of optical waveguides is typically substantially uniform.

In a second general aspect, an eyepiece assembly includes a first cover layer, a second cover layer, and a multiplicity of optical waveguides positioned between the first cover layer and the second cover layer. A contact angle of water on a surface of the multiplicity of optical waveguides may exceed 90°.

Implementations of the second general aspect may include one or more of the following features.

A surface of the multiplicity of optical waveguides typically includes an optically transparent hydrophobic or superhydrophobic coating. The surface of the multiplicity of optical waveguides can be nanopatterned with features having a size, shape, and spacing sufficient to achieve the contact angle of water exceeding 90° on the nanopatterned surface.

In a third general aspect, a method of fabricating an eyepiece assembly includes treating a surface of a multiplicity of polymer optical waveguides with an optically transparent hydrophobic or superhydrophobic coating to achieve a contact angle of water on the surface of the multiplicity of polymer optical waveguides that exceeds 90°, and assembling the multiplicity of polymer optical waveguides between a first cover layer and a second cover layer.

Implementations of the third general aspect may include one or more of the following features.

Treating the surface may include spin-coating, vapor deposition, or dipcoating. The coating may include a perfluorinated polymer, a fluorinated silane, an organically modified silica, or polydimethylsiloxane. A thickness of the coating is typically less than 10 nm or less than 5 nm.

In a fourth general aspect, a method of fabricating an eyepiece assembly includes forming a multiplicity of polymer optical waveguides with a polymerizable material including a release agent, a dopant, or a combination thereof, and assembling the multiplicity of polymer optical waveguides between a first cover layer and a second cover layer. A contact angle of water on the surface of the multiplicity of polymer optical waveguides exceeds 90°.

In a fifth general aspect, an eyepiece assembly includes a first cover layer, a second cover layer, and a multiplicity of optical waveguides positioned between the first cover layer and the second cover layer. Each optical waveguide includes at least one grating region on one or more surfaces of the optical waveguide. Grating regions can include an incoupling grating region, an orthogonal pupil expander region, and an exit pupil expander region. The first cover layer is adjacent to a first optical waveguide and the second cover layer is adjacent to a second optical waveguide. The eyepiece assembly includes an adhesive between the first cover layer and the first optical waveguide, between the second cover layer and the second optical waveguide, and between adjacent pairs of optical waveguides. The adhesive is arranged in one or more extended portions around a perimeter of the grating region.

Implementations of the fifth general aspect may include one or more of the following features.

The adhesive is typically not arranged in discrete drops. The eyepiece assembly may include a first additional extended portion of adhesive proximate an interface between the orthogonal pupil expander region and the exit pupil expander region and between the grating region and the adhesive around the perimeter of the grating region. The first additional extended portion of adhesive is typically L-shaped. In some cases, the eyepiece assembly of the fifth general aspect includes a second additional extended portion of adhesive proximate the first additional extended portion of adhesive and between the first additional portion of adhesive and the adhesive around the perimeter of the grating region. The eyepiece assembly of the fifth general aspect may further include an incoupling grating region, and may further include an additional extended portion of adhesive proximate an incoupling grating region and between the incoupling grating region and the adhesive around the perimeter of the grating region.

In a sixth general aspect, an eyepiece assembly includes a first cover layer, a second cover layer, and a multiplicity of optical waveguides positioned between the first cover layer and the second cover layer. Each optical waveguide has a grating region that can include an orthogonal pupil expander region and an exit pupil expander region. The first cover layer is adjacent to a first optical waveguide and the second cover layer is adjacent to a second optical waveguide. The eyepiece assembly includes an adhesive between the first cover layer and the first optical waveguide, the second cover layer and the second optical waveguide, and adjacent pairs of optical waveguides. The adhesive is arranged around a perimeter of the grating region. First microspheres are positioned in the adhesive arranged around the perimeter of the grating region, and second microspheres are positioned between adjacent optical waveguides in a region between the orthogonal pupil expander region and the exit pupil expander region.

Implementations of the sixth general aspect may include one or more of the following features.

In some cases, a diameter of the second microspheres exceeds a diameter of the first microspheres. The eyepiece assembly of the sixth general aspect may further include a first additional extended portion of adhesive proximate an interface between the orthogonal pupil expander region and the exit pupil expander region and between the grating region and the adhesive around the perimeter of the grating region, and third microspheres positioned in the first additional extended portion of adhesive. A diameter of the third microspheres is between the diameter of the first microspheres and the second microspheres. In some cases, the microspheres include silica.

Aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more embodiments of the present disclosure are set forth in the accompanying drawings and the description below. Other features and advantages of the present disclosure will be apparent from the description and drawings, and from the claims.

DETAILED DESCRIPTION

Aspects of the present disclosure are directed toward methods of fabricating polymer augmented reality (AR) and mixed reality (MR) eyepiece assemblies to improve parallelism and thus optical performance, as well as the resulting improved AR/MR polymer eyepiece assemblies. Fabrication of AR/MR polymer eyepiece assemblies and the resulting AR/MR polymer eyepiece assemblies may include one or more aspects described herein, separately or in any appropriate combination, to compensate for expected deformation and to maintain substantially uniform gaps between polymer layers. Various aspects include fabricating polymer eyepiece assemblies with components having coefficients of thermal expansion (CTE) that are substantially the same; modifying the surface chemistry or structure of one or more polymer layers to increase the hydrophobicity or omniphobicity; disposing adhesive between adjacent polymer layers in continuous and/or extended configurations; and disposing microspheres of different sizes at selected locations between polymer layers. As used herein, an "adjacent layers" refers to layers that are directly adjacent, such that there are no intervening eyepiece layers between two adjacent layers.

Figure 1:
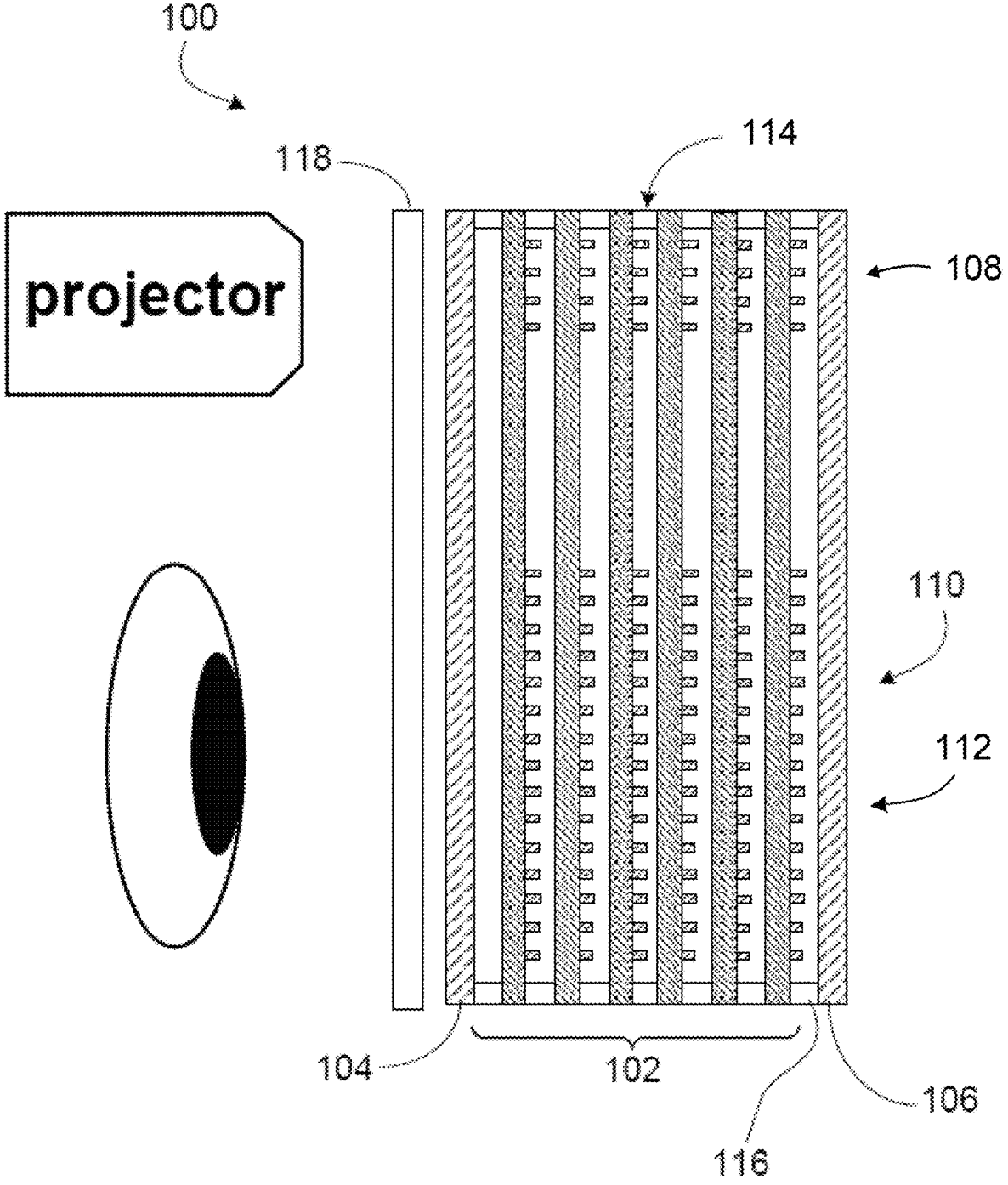
FIG. 1 is a top-down view of an example of a glass eyepiece assembly for an augmented reality (AR) or mixed reality (MR) system.
Figures 2A, 2B:
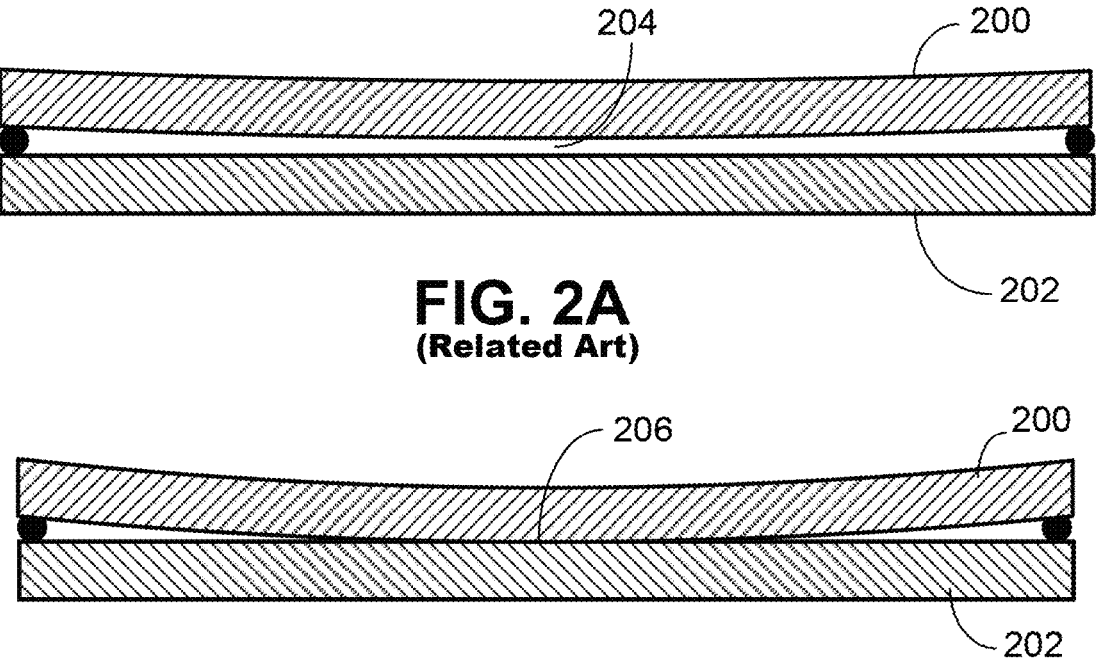
FIGS. 2A-2B depict bending of adjacent polymer waveguide layers in a polymer eyepiece assembly.
Figure 3:
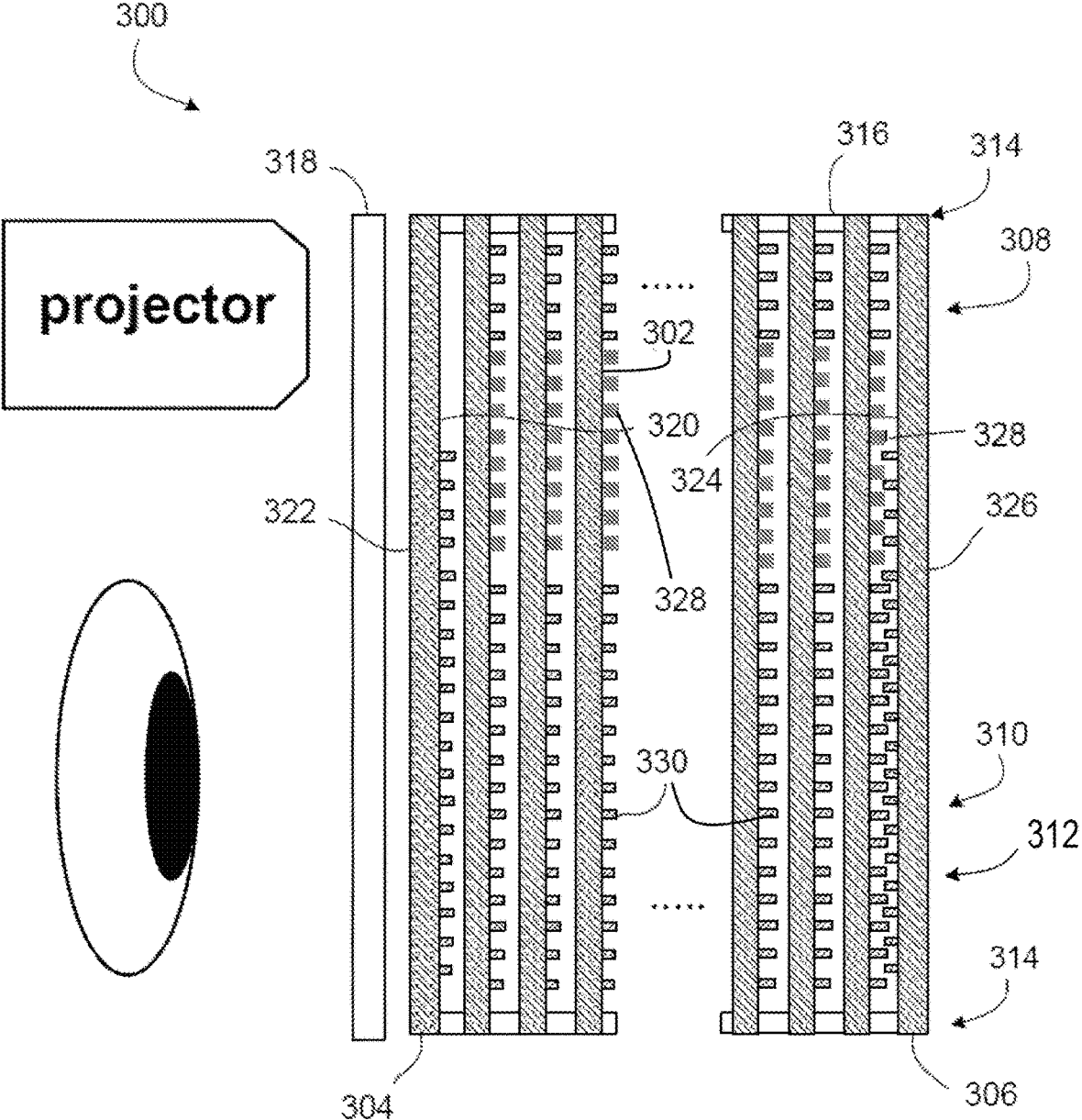
FIG. 3 is a top-down view of an example of a polymer eyepiece assembly for an AR/MR system.

In a first aspect, optical waveguides, covers, and adhesive of an eyepiece assembly are fabricated with a material having the same or substantially the same CTE (e.g., about 60 µm/m ° C. between about 0° C. and about 40° C. and about 100 µm/m ° C. between about 40° C. and about 60° C., or between about 30 μm/m ° C. and about 150 μm/m ° C. in a temperature range of about –20° C. to about 65° C.). FIG. 3 depicts polymer eyepiece assembly 300 including polymer optical waveguides 302 positioned between eye side polymer cover 304 and world side polymer cover 306. Polymer eyepiece assembly 300 includes a multiplicity of (e.g., 3, 4, 5, 6, 7, 8, 9, 10, or more) polymer optical waveguides 302. Polymer optical waveguides 302 and polymer covers 304, 306 typically have a thickness in a range of about 300 μm to about 1000 μm. Polymer optical waveguides 302 can include one or more grating regions, such as in-coupling grating (ICG) region 308, orthogonal pupil expander (OPE) region 310, and exit pupil expander (EPE) region 312. Polymer optical waveguides 302 and polymer covers 304, 306 are typically bonded at edges 314 with an ultraviolet (UV) curable adhesive 316 including silica microspheres of a size selected to achieve a desired spacing between adjacent layers. In some cases, polymer eyepiece assembly 300 includes polymer lens 318 (e.g., a prescription lens) which may be concave or convex. A substantially constant air gap of about 10 μm to about 500 μm between adjacent components (e.g., between a polymer cover and an adjacent polymer optical waveguide, or between two adjacent polymer optical waveguides) can be selected by combining microspheres of a selected size with the adhesive, or positioning the microspheres mechanically during fabrication. As used herein, "substantially constant" refers to ±10 μm or ±15 μm.

Polymer optical waveguides 302 are typically fabricated of a polymer material having a selected CTE (e.g., a CTE in a range of 30 μm/m ° C. and 150 μm/m ° C. in a temperature range of –20° C. to 65° C.). Suitable polymer materials include thiolene-based polymers, polycarbonate, polymethyl methacrylate (PMMA), polyetherimide, cyclic olefin polymers and copolymers, polystyrene, acrylic copolymers, and polyamide. Other suitable polymer materials include MR-7, MR-8, and MR-10 (available from Mitsui Chemicals), CR-39 (available from PPG Industries), and ORMO-STAMP (available from micro resist technologies GmbH). In some implementations, polymer covers 304, 306 are fabricated of the same polymer material used to fabricate polymer optical waveguides 302. In certain implementations, polymer covers 304, 306 are fabricated of a different polymer material than that used to fabricate polymer optical waveguides 302, but having a CTE substantially the same as that of the polymer optical waveguides (e.g., in a range of 30 μm/m ° C. to 150 μm/m ° C. over a temperature range of –20° C. to 65° C.). Adhesive 316 has a CTE substantially the same as that of the polymer used to fabricate polymer optical waveguides 302 and polymer covers 304, 306. One example of a suitable adhesive is DYMAX OP-4 Optical Adhesive (available from Dymax Corporation). Polymer lens 318 also has a CTE that is the same or substantially the same as that of the polymer used to fabricate polymer optical waveguides 302 and polymer covers 304, 306. Because polymer optical waveguides 302, polymer covers 304, 306, and adhesive 316 have a CTE that is the same or substantially the same, bending (e.g., bowing and warping) that occurs during fabrication (e.g., stacking of layers) and operation (e.g., thermal cycling) is reduced or minimized at least in part because the materials are able to expand and contract in a substantially similar amount, thereby reducing or minimizing variations in the air gap between adjacent layers.

In a second aspect, one or more of polymer optical waveguides 302, polymer covers 304, 306, and polymer lens 318 is altered (e.g., chemically or structurally) to increase the hydrophobicity or omniphobicity of the surface such that a contact angle of water on the surface exceeds 90°. Increasing a hydrophobicity or omniphobicity of adjacent surfaces promotes repulsion of the adjacent surfaces, thereby inhibiting contact of adjacent layers.

One example of structural alteration to increase hydrophobicity or omniphobicity includes providing additional nanopatterns to inside surface 320, outside surface 322, or both of eye side cover layer 304, inside surface 324, outside surface 326, or both of world side cover layer 306, or any combination thereof, to reduce the available contact area, such that the altered cover layer repels adjacent polymer optical waveguide 302. The additional nanopatterns are sized and positioned to achieve a "lotus effect" and so as not to interfere with or modify light interacting with the ICG region 308, the OPE region 310, or the EPE region 312. The increased hydrophobicity or omniphobicity of cover layers 304, 306 can reduce any sticking between the cover layers 304, 306 and adjacent polymer optical waveguides 302. Thus, even if the polymer layers and/or cover layers bow, warp, or bend to such an extent that they come into contact with each other, the hydrophobic surfaces created by nanopatterns reduce the ability of the layers to stick to each other. This promotes a uniform gap between the layers.

Another example of structural alteration includes providing additional nanopatterns 328 to polymer optical waveguides 302 to areas outside the light propagating path. Additional nanopatterns 328 can extend from the surface of polymer optical waveguides 302 up to about 50 nm further than the light propagation gratings 330 (including grating features located in ICG region 308, OPE region 310, and EPE region 312), thereby effectively repelling (without contacting) adjacent layers. Additional nanopatterns 328 (e.g., on polymer cover layers 304, 306, on polymer optical waveguides 302, or both) can be implemented to achieve the effect of an antireflective coating. Additional nanopatterns 328 are sized and positioned to achieve a "lotus effect" and so as not to interfere with or modify light interacting with the ICG region 308, the OPE region 310, or the EPE region 312, as described above with respect to the nanopatterns disposed on cover layers 304, 306.

One example of chemical alteration to increase hydrophobicity or omniphobicity includes treating a surface of polymer optical waveguide 302, polymer covers 304, 306, or any combination thereof, with an optically transparent hydrophobic and/or superhydrophobic coating to reduce a surface energy of a blank (i.e., non-patterned) portion of the surface. Treating the surface to form a hydrophobic or omniphobic coating may include aging the surface with water or heat (e.g., 40° C.-60° C. for at least one week) or forming a thin film (e.g., less than 10 nm or less than 5 nm) of a fluorine- or silicon-containing compound (e.g., TEFLON, polydimethylsiloxane, fluorinated silane, or organically modified silica nano-coating) on the surface. The coating may be applied by spin-coating, vapor deposition, dip coating, or other appropriate method. The anti-sticking property of a surface of the polymer optical waveguide can also be enhanced by combining a release agent or appropriate dopant in the polymerizable material used to fabricate the polymer optical waveguide. A concentration of the release agent may be selected to avoid negative impact on the refractive index and other optical properties of the resulting polymer.

Figure 4A:
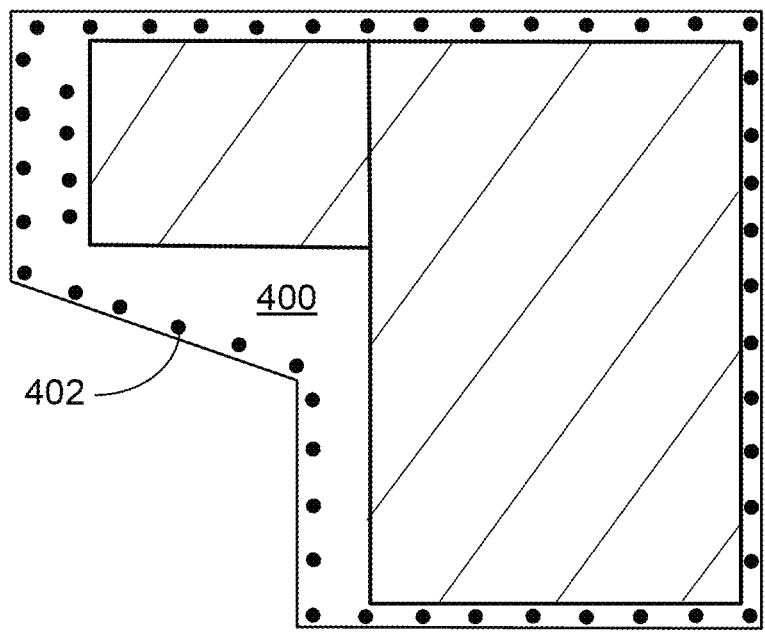
FIG. 4A is a top view of an example of discontinuous placement of adhesive between layers in a glass eyepiece assembly for an AR/MR system.
Figure 4B:
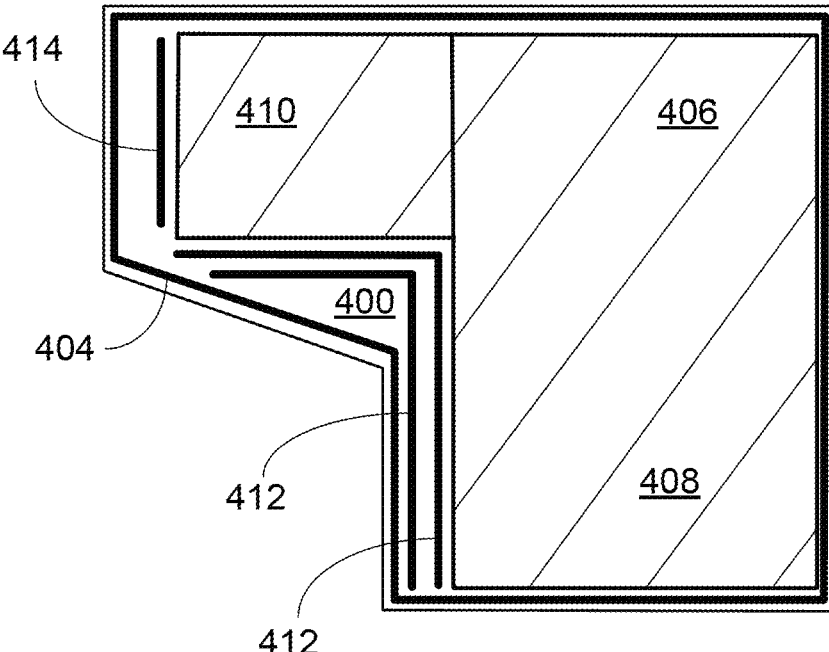
FIG. 4B is a top view of an example of continuous and extended placement of adhesive between layers in a polymer eyepiece assembly.

In a third aspect, an adhesive is disposed on a first polymer layer (e.g., a polymer cover or a polymer optical waveguide) in such a way as to adhere the first polymer layer to a second polymer layer (e.g., a polymer optical waveguide or a polymer cover) more closely to the center of the eyepiece without interfering with the optical properties of the eyepiece. The adhesive may be applied in a continuous or extended configuration instead of in discrete drops. FIG. 4A depicts an example in which adhesive is disposed on polymer layer 400 as discrete drops 402. In contrast, FIG. 4B depicts an example in which adhesive is disposed on polymer layer 400 as continuous portion of adhesive 404 rather than as discrete drops. Continuous portion of adhesive 404 is disposed around a perimeter of polymer optical waveguide 400 including OPE 406 and EPE 408 with ICG 410. Reinforcing portions of adhesive are disposed proximate OPE 406, EPE 408, and ICG 410. Specifically, reinforcing portion of adhesive 414 is disposed proximate ICG 410, and reinforcing L-shaped portions 412 are disposed proximate the interface of ICG 410, OPE 406, and EPE 408. Reinforcing adhesive portions, disposed closer to a center area of the eyepiece, provide additional support to polymer layer 400 and help maintain a uniform air gap between the adjacent layers. Other patterns of reinforcing portions can also be implemented to provide additional support to adhered polymeric layers.

In a fourth aspect, microspheres of selected sizes (e.g., 10 μm to 200 μm in diameter) are disposed on various regions across a polymer layer of a polymer eyepiece assembly to help maintain a uniform air gap between polymer layers (e.g., between a polymer cover and a polymer optical waveguide or between two polymer optical waveguides). The microspheres may be made of silica or other appropriate material. Examples of suitable microspheres include glass spheres available from Cospheric. Microsphere size and regions in which microspheres are disposed are selected such that the microspheres compensate for any expected deformation of the polymer layers during fabrication and operation (e.g., during thermal cycles at temperatures up to 65° C.). Hence, larger microspheres may be selected for a region in which the deformation is expected to be larger, and smaller microspheres may be selected for a region in which the deformation is expected to be smaller. Microsphere size is also selected to be small enough such that the microspheres do not interfere with light propagation. In some cases, a filler with suitable optical properties (e.g., an aerogel) may be disposed between adjacent polymer layers.

Figure 5A:
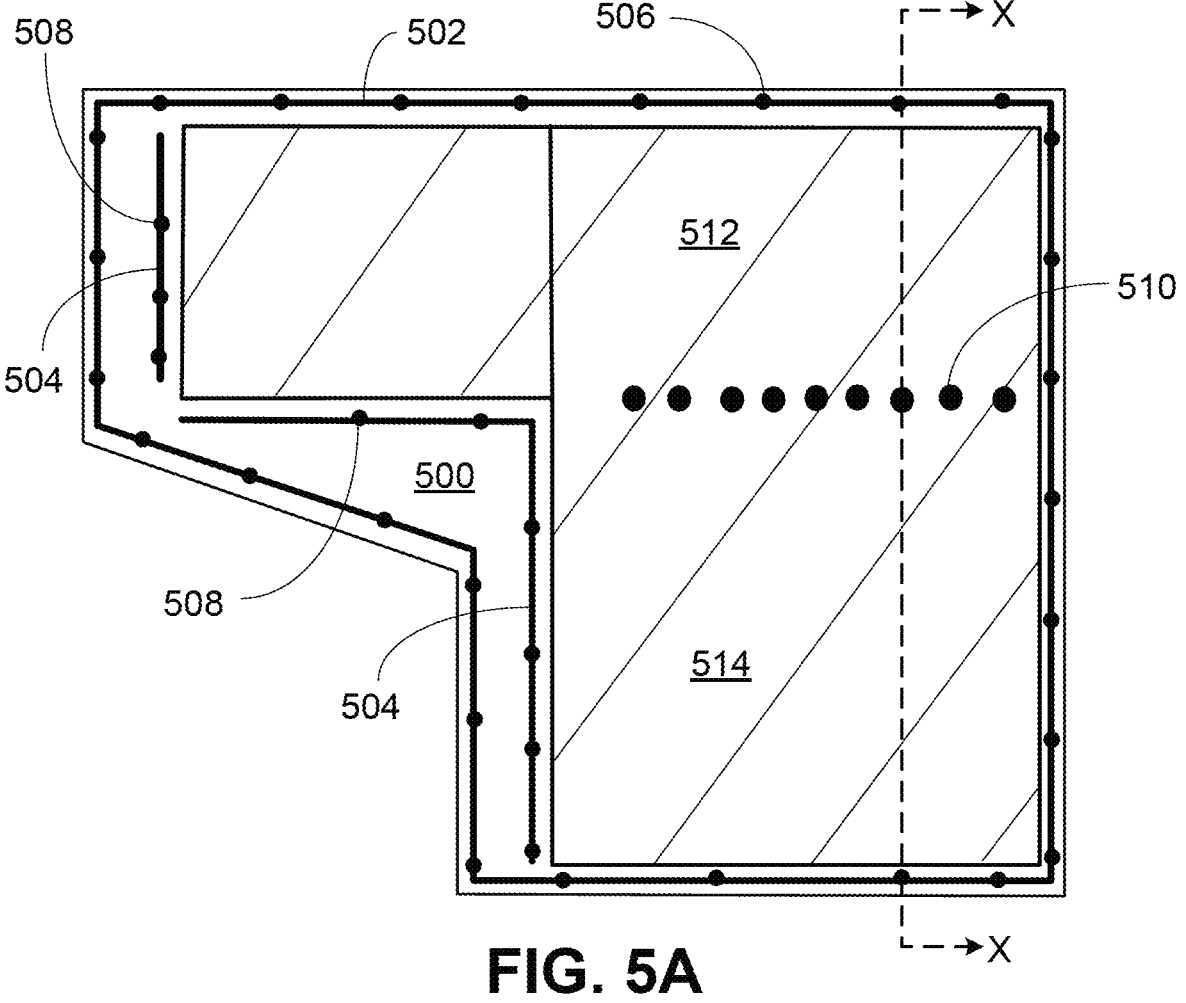
FIG. 5A is a front view of an example of microsphere placement between layers in a polymer eyepiece assembly.
Figure 5B:
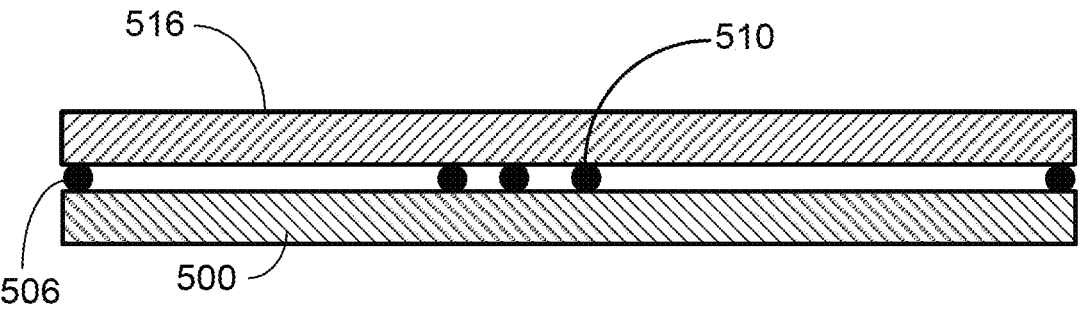
FIG. 5B is a side view of an example of microsphere placement between layers in a polymer eyepiece assembly.

FIG. 5A is a top view of polymer optical waveguide 500, with adhesive portion 502 applied in a continuous configuration around a perimeter of the polymer optical waveguide. Adhesive portion 504 is applied in an extended configuration. Small microspheres 506 are disposed in adhesive portion 502 and medium microspheres 508 are disposed in adhesive portion 504. Large microspheres 510 can be placed between OPE 512 and EPE 514. Large microspheres 510 are depicted in a single row orthogonal to plane X-X for ease of illustration. In some cases, however, the microspheres are disposed in a region but not necessarily in rows, and there may be more than one microsphere in the cross section of polymer optical waveguide 500 along plane X-X of FIG. 5A. FIG. 5B is a cross-sectional view through plane X-X of FIG. 5A, showing polymer optical waveguide 500, adjacent polymer optical waveguide 516, small microspheres 506, and large microspheres 510. In FIG. 5B, large microspheres 510 are depicted as disposed in three rows extending parallel to plane X-X of FIG. 5A.

Figure 6:
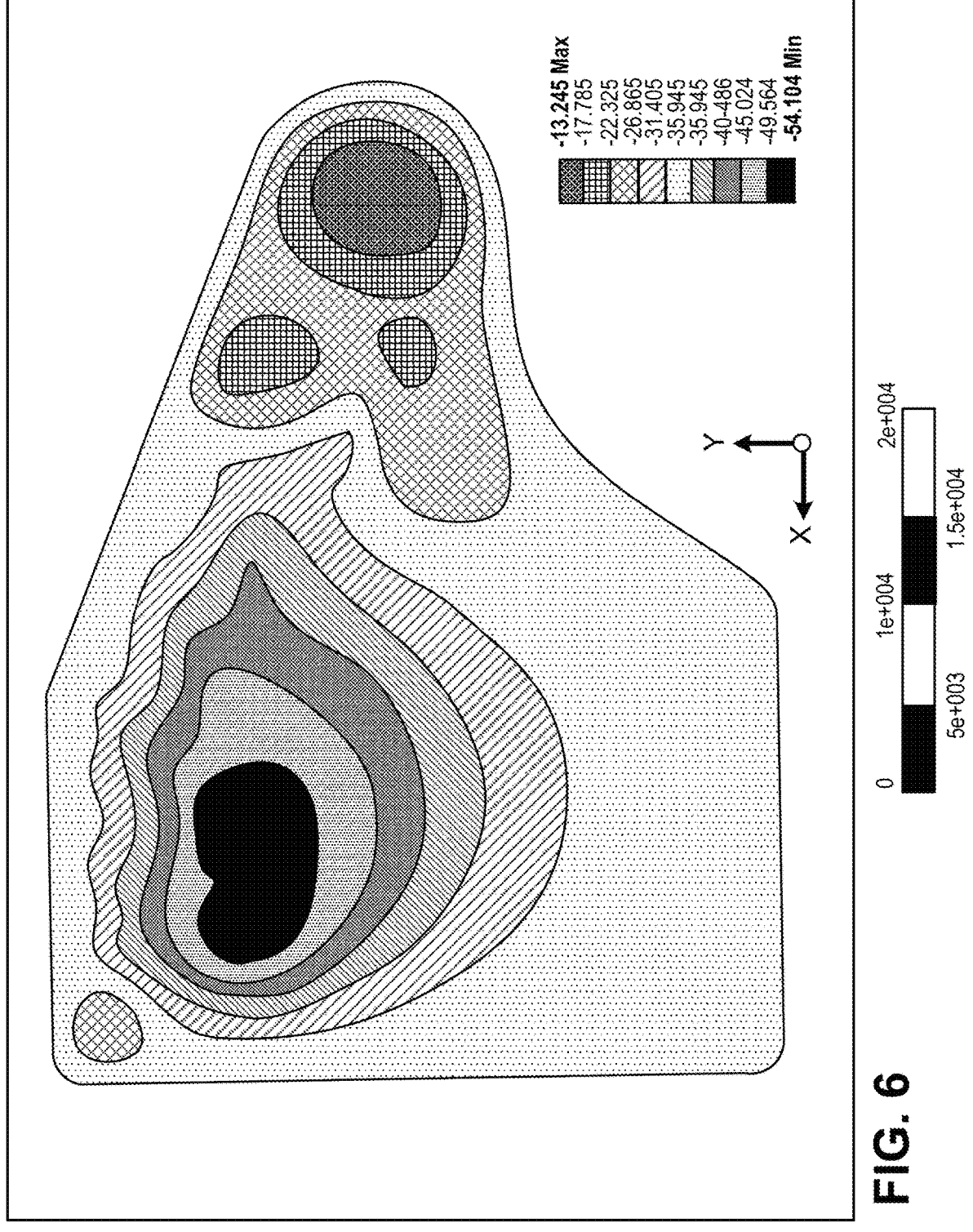
FIG. 6 shows a contour plot of air gap distribution between a world side cover and an adjacent polymer waveguide in a polymer eyepiece assembly.

FIG. 6 shows a contour plot of a calculated air gap distribution (units in microns) between a polymer world side cover and a first polymer optical waveguide during operation in an ambient environment in the absence of any corrective features described in this disclosure. A temperature of the eyepiece assembly ranges from about 40° C. to about 55° C. Implementation of any one or more of the described corrective features would decrease the air gap depicted in FIG. 6.

Only a few implementations are described and illustrated. Variations, enhancements and improvements of the described implementations and other implementations can be made based on what is described and illustrated in this document.

What is claimed is:

1. An eyepiece assembly comprising:
   a first cover layer, wherein the first cover layer is an eye side cover layer;
   a second cover layer, wherein the second cover layer is a world side cover layer;
   a multiplicity of optical waveguides positioned between the first cover layer and the second cover layer, wherein the first cover layer is adjacent to a first optical waveguide and the second cover layer is adjacent to a second optical waveguide; and
   an adhesive between:
      the first cover layer and the first optical waveguide,
      the second cover layer and the second optical waveguide, and
      adjacent pairs of optical waveguides,
   wherein:
      each optical waveguide comprises a grating region comprising an orthogonal pupil expander region and an exit pupil expander region, and further comprising:
         first microspheres positioned in an adhesive arranged around a perimeter of each of the grating regions; and
         second microspheres positioned between adjacent optical waveguides in a region between the orthogonal pupil expander region and the exit pupil expander region,
         wherein a diameter of the second microspheres exceeds a diameter of the first microspheres.

2. The eyepiece assembly of claim 1, wherein a gap between adjacent pairs of optical waveguides is substantially uniform.

3. The eyepiece assembly of claim 1, further comprising:
   a first additional extended portion of adhesive proximate an interface between the orthogonal pupil expander region and the exit pupil expander region and between the grating region and the adhesive around the perimeter of the grating region; and
   third microspheres positioned in the first additional extended portion of adhesive.

4. The eyepiece assembly of claim 1, wherein the first cover layer, the second cover layer, and each optical waveguide of the multiplicity of optical waveguides comprises a polymer material, and a coefficient of thermal expansion of the polymer material and the adhesive is substantially the same.

5. The eyepiece assembly of claim 4, wherein the first cover layer, the second cover layer, and the multiplicity of optical waveguides comprise the same polymer material.

6. The eyepiece assembly of claim 4, wherein the coefficient of thermal expansion of the polymer material and the adhesive is in a range of 30 μm/m° C. to 150 μm/m° C.

7. The eyepiece assembly of claim 4, wherein the coefficient of thermal expansion of the polymer material and the adhesive is substantially the same over a temperature range of about 20° C. to about 65° C.

8. The eyepiece assembly of claim 1, wherein the adhesive is arranged in one or more extended portions around a perimeter of each of the grating regions.

9. The eyepiece assembly of claim 8, further comprising a first additional extended portion of adhesive proximate an interface between the orthogonal pupil expander region and the exit pupil expander region and between the grating region and the adhesive around the perimeter of the grating region.

10. The eyepiece assembly of claim 9, wherein the first additional extended portion of adhesive is L-shaped.

11. The eyepiece assembly of claim 9, further comprising a second additional extended portion of adhesive proximate the first additional extended portion of adhesive and between the first additional portion of adhesive and the adhesive around the perimeter of the grating region.

12. The eyepiece assembly of claim 8, further comprising an incoupling grating region, and further comprising an additional extended portion of adhesive proximate the incoupling grating region and between the incoupling grating region and the adhesive around the perimeter of the grating region.

13. The eyepiece assembly of claim 1, wherein the adhesive is arranged around a perimeter of each of the grating regions.

14. The eyepiece assembly of claim 1, further comprising a lens positioned adjacent to the first cover layer.

15. The eyepiece assembly of claim 1, wherein a contact angle of water on a surface of the first cover layer, a surface of the second cover layer, or both exceeds 90°.

16. The eyepiece assembly of claim 1, wherein each optical waveguide comprises a nanopattern extending from a surface of the optical waveguide and configured to repel an adjacent optical waveguide.

17. The eyepiece assembly of claim 16, wherein the nanopattern is positioned outside a light propagating path of the eyepiece assembly.

* * * * *